(Model.)
J. M. DOLEN.
SAFETY ATTACHMENT FOR DAMPERS.
No. 286,400. Patented Oct. 9, 1883.
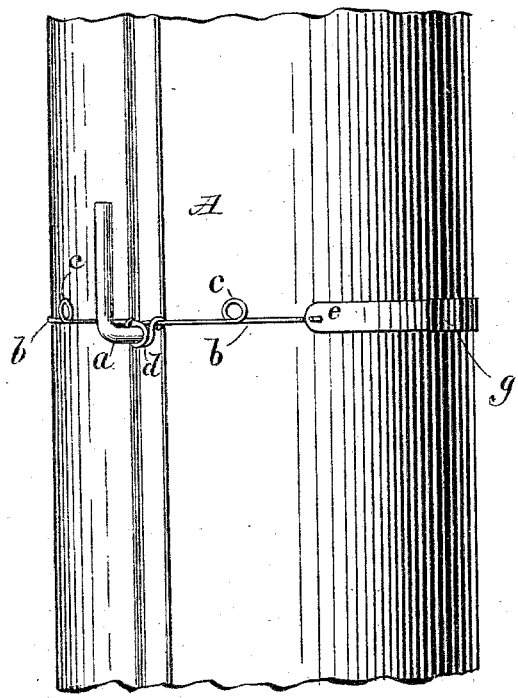
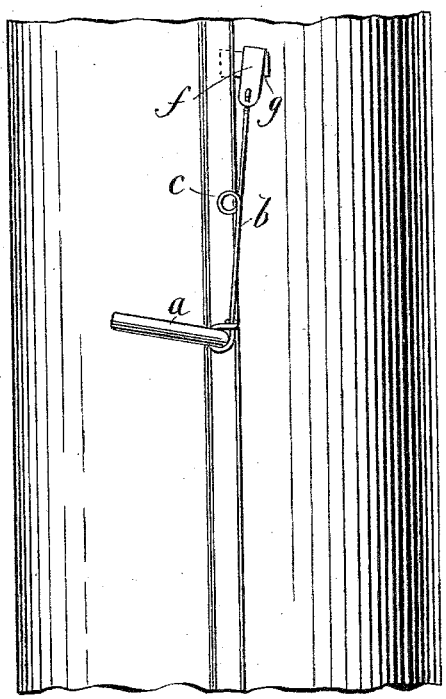
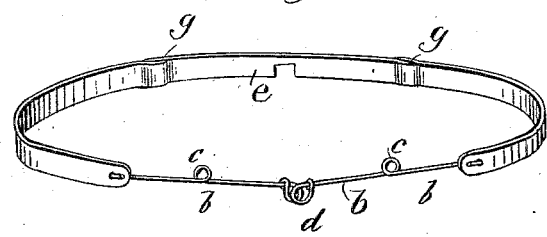
WITNESSES:
INVENTOR:
J. M. Dolen
BY
ATTORNEYS.

UNITED STATES PATENT OFFICE.

JOHN M. DOLEN, OF WICONISCO, PENNSYLVANIA.

SAFETY ATTACHMENT FOR DAMPERS.

SPECIFICATION forming part of Letters Patent No. 286,400, dated October 9, 1883.

Application filed April 25, 1883. (Model.)

*To all whom it may concern:*

Be it known that I, JOHN M. DOLEN, of Wiconisco, in the county of Dauphin and State of Pennsylvania, have invented a new and Improved Safety Attachment for Dampers, of which the following is a full, clear, and exact description.

The object of my invention is to provide for closing dampers of stove-pipes automatically when the heat becomes excessive, so as to avoid danger from overheating of the stove and pipe; and the invention consists in a friction device arranged to hold the damper open, and made fusible, so as to give way when the pipe becomes highly heated, as hereinafter described and claimed.

Reference is to be had to the accompanying drawings, forming a part of this specification, in which similar letters of reference indicate corresponding parts in all the figures.

Figure 1 is a side view of a section of stove-pipe with the safety device applied. Fig. 2 is a similar view, representing a modification in construction; and Fig. 3 is a perspective view of the band detached.

The pipe A is fitted with a damper of usual character, of which $a$ is the handle. The damper is fitted to turn easily, and weighted to close by gravity when not held. $b\ b$ are wires formed with eyes $d$ at one end, which are passed over the handle of the damper, and also looped at $c\ c$, to form springs, that give the required friction by which the eyes $d$ are drawn tightly on the handle $a$. In Figs. 1 and 3 the wires are connected to a band, $e$, which passes around the stove-pipe, so that the wires are held securely. In Fig. 2 the wires are connected to a band or piece, $f$, that is inserted into the seam of the pipe, so as to be held fast. In either case the wires are tightly drawn, so that the eyes hold the damper in any position. The bands $e$ or $f$ are made in two or more pieces, joined, as at $g$, by soft solder or other composition that will melt readily and release the wires. By this construction and arrangement the ordinary use of the damper is not interfered with, and it is held open more or less, as desired. In case the damper is left open and the stove-pipe becomes heated beyond a safe point, the fusible joints of the holder will separate, and the device being thereby released the damper will close by gravity. The damper should be arranged not to close tightly, but to leave a space for escape of gas.

Having thus described my invention, I claim as new and desire to secure by Letters Patent—

1. The safety attachment for dampers, consisting of spring-wires $b$, formed with eyes at one end, a fusible band or piece connected to the wires, and arranged for being held on the stove-pipe, substantially as described.

2. The wires $b$, formed with eyes $d$, and the band $e$, having a fusible joint combined for attachment to a stove-pipe and damper, substantially as and for the purpose specified.

JOHN M. DOLEN.

Witnesses:
G. A. PINKERTON,
R. M. MCNEAL.